United States Patent [19]

Capek et al.

[11] Patent Number: 4,575,691

[45] Date of Patent: Mar. 11, 1986

[54] CABLE ISOLATOR WITH OVERVOLTAGE PROTECTION

[75] Inventors: Raymond G. Capek, Elmhurst; Anthony Cocco, Chicago; Leonard Dietch; Michael Livshits, both of Skokie, all of Ill.

[73] Assignee: Zenith Electronics Corporation, Glenview, Ill.

[21] Appl. No.: 622,415

[22] Filed: Jun. 20, 1984

[51] Int. Cl.⁴ .......................... H01P 1/202; H02H 9/06

[52] U.S. Cl. ...................................... 333/12; 333/17 L; 333/185; 333/206; 361/56; 361/119

[58] Field of Search ......... 333/12, 13, 17 L, 206–207, 333/245, 260, 181–185; 361/56, 111, 117–120, 91

[56] References Cited

U.S. PATENT DOCUMENTS

| | | | |
|---|---|---|---|
| 4,198,613 | 4/1980 | Whitely | 333/181 |
| 4,453,153 | 6/1984 | Capek et al. | 333/12 X |
| 4,467,390 | 8/1984 | Carpenter, Jr. | 333/17 L |
| 4,509,090 | 4/1985 | Kawanami et al. | 361/119 |

*Primary Examiner*—Marvin L. Nussbaum

[57] ABSTRACT

A coaxial cable isolator includes ceramic capacitive and inductive elements for isolating the cable sheath from low frequency power current while passing high frequency television signal current. A ceramic resistance ring is positioned inside the isolator and forms a gap with the inner conductor thereof for precluding rapid buildup of voltage across the interruption in the isolator by discharging high energy currents thereacross. The ceramic material has about 15,000 ohms resistance for precluding power follow-through current after occurrence of a high energy discharge.

8 Claims, 4 Drawing Figures

CABLE ISOLATOR WITH OVERVOLTAGE PROTECTION

BACKGROUND OF THE INVENTION AND PRIOR ART

This invention relates in general to line isolation and interference shielding systems for shielded conductors and in particular, to such line isolation systems including means for preventing dangerous voltage buildups across the line isolator.

It is well known to provide a line isolator and interference shield for a 75 ohm coaxial cable used in cable connected television systems. In such systems, the cable sheath is a metallic braid that serves as the return wire for the two conductor system. The cable system operator establishes a good "earth" ground connection to preclude the cable braid or sheath from "floating", which could give rise to potentially dangerous voltages. The operator also wants to isolate the cable ground connection from the low frequency power line ground at the user site. The isolator supplies both needs. Since splitting the ground connection provides an opportunity for high frequency electromagnetic energy to interfere with the television signals being carried by the cable, as is fully described in U.S. Pat. No. 4,399,419 issued to Pierre Dobrovolny and assigned to Zenith Radio Corporation, the line isolator includes means allowing passage of the high frequency television signals while absorbing external electromagnetic energy.

The interruption in the line isolator precludes the cable sheath from acting as a low frequency power return should, for some reason, the power line ground at the user site become faulty. Normally, the site ground is provided by a ground rod or water pipe. Occasionally the ground connection develops problems which manifest themselves in the resistance of the connection departing from zero (or from a very low value near zero). It is not uncommon for the low frequency power ground return circuit at the site to be completed through the cable sheath of the well-grounded cable system, with consequent overload and damage to the cable. With an isolator constructed in accordance with the above patent, that is not possible since there is a discontinuity between the user site ground connection and the grounded sheath of the cable.

It is well known that antenna systems are prone to static discharge voltage buildups as well as to energy buildups caused by lightning strokes and the like. The same is true for cable-connected systems where the cables are run above ground. In the event of a lightning strike, for example, current must be channelled to ground as quickly as possible. The line isolator of the above patent includes ceramic capacitor and inductor elements that provide a fairly substantial leakage path thereacross for preventing excessive voltage buildup across the isolator. However, for very brief time periods, there can be a fairly significant voltage buildup across the isolator before the leakage across the ceramic elements has had an opportunity to dissipate the energy to ground.

The invention precludes even "short term" buildup of excessive potential across the isolator, even in the presence of high potential energy, by providing a very low resistance path to ground when the potential across the isolator reaches a predetermined magnitude.

OBJECTS OF THE INVENTION

A principal object of the invention is to provide a novel line isolation system for a shielded conductor.

Another object of the invention is to provide a line isolator that will not permit an excessive voltage buildup thereacross.

A further object of the invention is to provide an improved line isolator for use in cable television systems.

SUMMARY OF THE INVENTION

In accordance with the invention a coaxial cable line isolator, having an inner conductive element and an outer conductive element and which is adapted to couple high frequency signals to a device that is powered from a low frequency power source, includes an interruption in the outer conductive element for blocking the flow of low frequency current, means bridging the interruption for high frequency signals and for precluding relatively long term voltage buildup thereacross, and energy discharge means in the interruption for rapidly conducting energy thereacross to limit short term buildup of voltage to a safe value.

BRIEF DESCRIPTION OF THE DRAWING

Further objects and advantages of the invention will be apparent upon reading the following description in conjunction with the drawing in which.

DESCRIPTION OF THE PREFERRED EMBODIMENT

Figure 1:
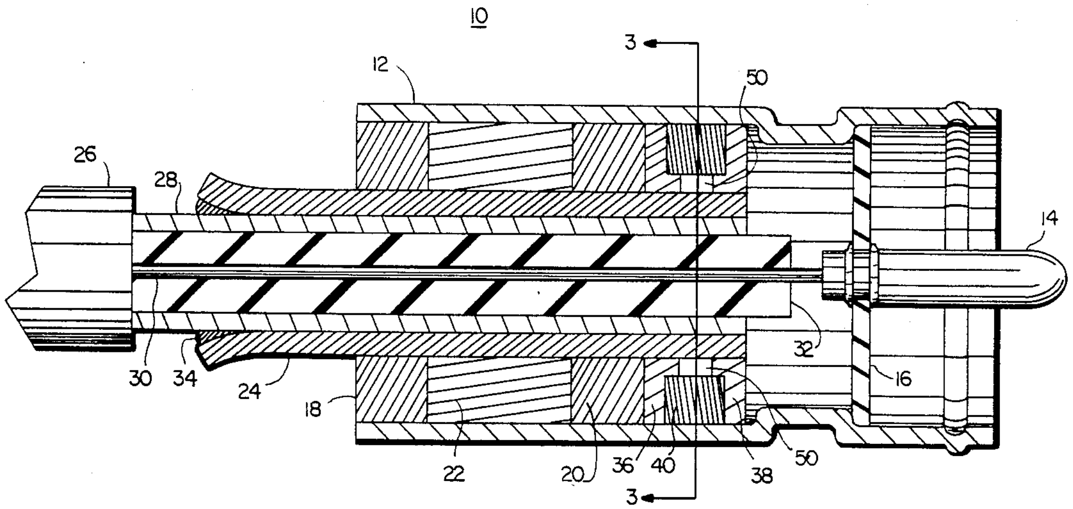
FIG. 1 is a cross section of a line isolator constructed in accordance with the invention.

In FIG. 1, the cross section of a line isolator 10 includes a generally cylindrical outer conductive element 12 with a centrally disposed inner conductive plug member 14 supported in outer conductive element 12 by an insulated annular spacer 16. Plug member 14 and outer conductive element 12 are adapted to cooperate with a suitable coaxial cable socket member (not shown) in a well known manner to make suitable connections thereto. The isolator further includes a centrally disposed tubular inner conductive element 24 having a flared end. Element 24 is supported within outer element 12 over a major portion of its length by annular ceramic elements, as will be described. Tubular inner conductive element 24 is designed to support a coaxial cable terminated in the isolator.

It will be appreciated that other isolator configurations may be used. For example, in the cable industry simple plug-in isolators are desirable, that is, isolators equipped with coaxial connectors on each end. Thus, in place of the coaxial cable, a coaxial connector element may be bonded to outer conductive element 12 and to inner conductive element 24. A popular configuration is one in which each end of the isolator is equipped with a female connector.

A coaxial cable having an insulated covering 26, an outer metallic braid sheath 28, insulating means 32 and a center conductor 30 is shown assembled in isolator 10.

The center conductor 30 is soldered in plug member 14 and sheath 28 is soldered to inner conductive element 24 of the isolator as indicated at 34. As taught in the abovementioned patent, the isolator includes annular ceramic capacitor elements 18 and 20 mounted between the inner and outer cylindrical conductive elements 12 and 24 of the isolator. Sandwiched between the capacitors is a ceramic ferrite inductor 22 for absorbing electromagnetic energy. As further described in the patent, the exterior and interior surfaces of ceramic elements 18 and 20 may be metallized and soldered to respective conductive elements 12 and 24.

As thus described, the isolator is conventional and taught in the patent. The ceramic elements exhibit a leakage resistance that prevents any relatively long term voltage buildup across the isolator. By relatively long term, a time period of ten seconds or more is meant.

The isolator of the invention also includes energy discharge means consisting of a pair of insulating spacers 36 and 38 sandwiching a ceramic resistance element 40. All of the elements are of annular construction. Resistance element 40 has an inner diameter that is larger than the outer diameter of inner conductive element 24 of the line isolator. Thus a cylindrical air gap 50 is formed between elements 24 and 40. This air gap 50 functions as a spark gap and breaks down in the presence of a sufficiently high voltage across inner conductive element 24 and outer conductive element 12 of the line isolator.

Figure 3:
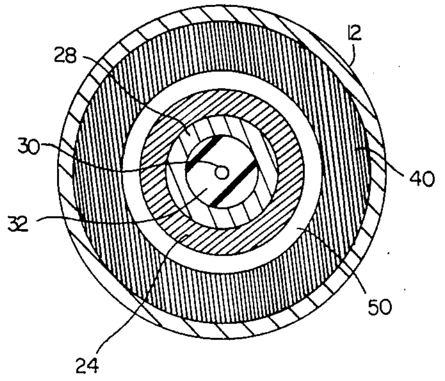
FIG. 3 is a cross section of the isolator of FIGURE 1 taken along the line 3—3.
Figure 2:
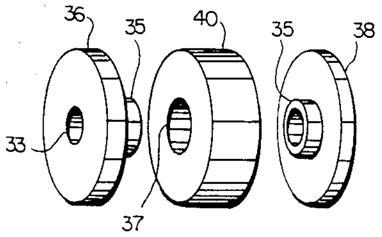
FIG. 2 is a disassembled perspective view of the energy discharge means of the invention.
Figure 4:
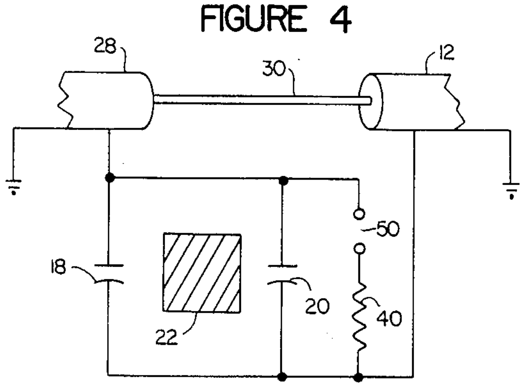
FIG. 4 is a partial schematic diagram showing the electrical arrangement of a line isolator constructed in accordance with the invention.

Reference to FIGS. 2, 3 and 4 will help clarify the construction and arrangement of the parts of the invention. Resistance element 40 has a ring-like configuration having an inner diameter 37. Spacers 36 and 38 have inner diameters 33 that are sufficiently large to accept the outer diameter of inner conductive element 24 of the line isolator. These spacers include shoulders 35, each having an outer diameter slightly smaller than inner diameter 37 of resistance element 40 to enable the resistance element to be firmly supported therebetween. The distance between the surface of inner conductive element 24 of the line isolator and inner diameter 37 of resistance element 40 determines the spark gap dimension and the maximum potential that is therefore permitted across the isolator.

The arrangement of the parts is clearly seen in the cross sectional view of FIG. 3. The spark gap 50 takes the form of an annular ring of substantially uniform dimensions. In the event of an excessive voltage buildup between outer conductive element 12 and inner conductive element 24, an arcover occurs to rapidly discharge the energy along the cable sheath or through the connected appliance ground to a suitable ground connection at the user site. This rapid discharge of energy thus precludes any excessive voltage buildup across the isolator.

The circuit diagram of FIG. 4 illustrates the electrical arrangement of the isolator and the interruption it imposes between the grounded sheath of the incoming cable and the line isolator outer conductive element 12. Capacitors 18 and 20 are seen to be connected in parallel between the cable sheath and inner conductive element 12 for passing high frequency signal energy while blocking any low frequency or DC current flow. The ferrite electromagnetic absorption material 22 is illustrated and functions to absorb extraneous electromagnetic high frequency energy to keep it from entering the interruption in the cable system caused by the isolator.

A spark gap 50 is indicated as being coupled across the capacitors with resistance element 40 connected in series therewith. In practice, the spark gap is about 0.015 inches and is adequate to limit short term voltage buildup across the isolator to a range of 700 to 900 volts.

Under normal circumstances there is a good low frequency electrical power ground connection at the user site, to which the cable is connected. For such situations the element 40 need not be resistive but may simply be conductive. In that event the circuit diagram of FIG. 4 is changed to reflect only a spark gap 50 being connected across capacitor 20 since the resistance is eliminated. Resistor element 40 is introduced for the sole purpose of precluding low frequency power follow-through currect from flowing in the event of a discharge across the spark gap in an environment where the user site power ground connection is poor. During a discharge, the air in the gap becomes ionized and, if there is a poor ground connection associated with the user site at which the cable is connected, some or all of the low frequency power current may flow across the ionized gap and along the cable sheath to the cable system ground. It has been found that a resistance of about 15,000 ohms is sufficient to extinguish the arc and prevent low frequency power follow-through current. Obviously, it is difficult to predict when any particular user site ground may become impaired and since the resistance can be conveniently "built into" the ceramic material, that is the preferred form of the invention.

What has been described is a novel line isolator that includes means for preventing short term excessive voltage buildup across the interruption of the isolator as well as long term voltage buildup. It is recognized that numerous changes and modifications in the described embodiment of the invention will be apparent to those skilled in the art without departing from the ture spirit and scope thereof. The invention is to be limited only as defined in the claims.

What is claimed is:

1. A coaxial cable line isolator having an inner conductive element and an outer conductive element for coupling a high frequency signal to a device adapted to be powered from a low frequency power source, said isolator including an interruption in the outer conductive element for low frequency energy and including ceramic capacitor and inductor element means bridging the interruption for high frequency energy and precluding relatively long term voltage buildup thereacross, but being susceptable to short term high voltage buildup across the interruption from high voltage energy comprising:

spark gap energy discharge means in said interruption for rapidly conducting energy thereacross, to limit short term buildup of voltage to a safe value, said spark gap energy discharge means being formed by a conductive ceramic element spaced with respect to at least one of said inner and said outer conductive elements.

2. The isolator of claim 1 wherein all said ceramic elements comprise annular discs having central openings surrounding said inner conductive element and outer circumferences contacting the inside of said outer conductive element.

3. The isolator of claim 2 further including a pair of insulating discs forming cylindrical shoulders sandwiching said conductive ceramic element therebetween to help define said spark gap.

4. The isolator of claim 3 wherein said conductive ceramic element spark gap has a resistance selected to extinguish low frequency current flow across said spark gap after occurrence of a high energy discharge.

5. The isolator of claim 4 wherein the outer surface of said ceramic element spark gap is metallized to make good electrical contact with said outer conductive element.

6. The isolator of claim 5 wherein the dimension of said spark gap is about 0.015" and the resistance of said ceramic element is about 15,000 ohms.

7. A line isolator for a cable connected television system for precluding establishment of a low frequency power ground return path through the cable sheath by providing an interruption for low fequency energy and including ceramic capacitive and inductive elements in the interruption for passing high frequency energy thereacross; and a spark gap connected across said interruption for precluding rapid high voltage buildup across said interruption resulting from high energy on said cable sheath, said spark gap comprising a ring of conductive material positioned in said interruption and introducing an air gap across said capacitive elements.

8. The isolator of claim 7 wherein said ring of conductive material presents a resistance for preventing low frequency power follow-through current across said gap after occurrence of a high energy discharge thereacross.

* * * * *